(12) United States Patent
Tsuzuki et al.

(10) Patent No.: US 11,085,543 B2
(45) Date of Patent: Aug. 10, 2021

(54) BUTTERFLY VALVE INCLUDING A VALVE BODY, SHAFT, GROOVE PORTION AND SEAL RING

(71) Applicant: DENSO CORPORATION, Kariya (JP)

(72) Inventors: Yushi Tsuzuki, Kariya (JP); Noriyuki Inagaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/774,324

(22) Filed: Jan. 28, 2020

(65) Prior Publication Data

US 2020/0240523 A1 Jul. 30, 2020

(30) Foreign Application Priority Data

Jan. 30, 2019 (JP) .............................. JP2019-014504

(51) Int. Cl.
*F16K 1/226* (2006.01)
*F02D 9/10* (2006.01)
*F02M 26/70* (2016.01)

(52) U.S. Cl.
CPC .......... *F16K 1/2261* (2013.01); *F02D 9/1015* (2013.01); *F02M 26/70* (2016.02)

(58) Field of Classification Search
CPC .......... F16K 1/2261; F02M 26/70; F16J 1/00; F02D 9/1005; F02D 9/101; F02D 9/1015; F02D 9/102
USPC .......................................... 251/306; 123/337
See application file for complete search history.

(56) References Cited

U.S. PATENT DOCUMENTS

| | | | | |
|---|---|---|---|---|
| 1,819,890 A | * | 8/1931 | Gleason | F16J 9/14 277/458 |
| 2,840,338 A | * | 6/1958 | Shaw | F16K 1/226 251/306 |
| 3,059,897 A | * | 10/1962 | Jensen | F16K 1/2261 251/306 |
| 4,290,615 A | * | 9/1981 | Etcheverry | F16K 1/2263 251/306 |
| 4,632,360 A | * | 12/1986 | DeSalve | F16K 1/228 251/173 |
| 5,039,116 A | * | 8/1991 | Maeda | F16J 9/206 277/444 |
| 6,439,255 B1 | * | 8/2002 | Chamberlain | F16K 1/2261 137/15.25 |
| 7,234,444 B2 | * | 6/2007 | Nanba | F02M 26/50 123/337 |

(Continued)

FOREIGN PATENT DOCUMENTS

JP 2016-211678 12/2016

*Primary Examiner* — John Bastianelli
(74) *Attorney, Agent, or Firm* — Nixon & Vanderhye P.C.

(57) ABSTRACT

A valve body has a substantially disk shape and is provided in a gas passage. A shaft supports the valve body so as to be rotatable in the gas passage. A groove portion is provided at an outer edge portion of the valve body on an outer side in a radial direction so as to extend in a circumferential direction of the valve body. A seal ring is formed in an annular shape, has a separated portion as a cut in a part in the circumferential direction, and is fitted in the groove portion of the valve body. At least one of one end surface in a circumferential direction and the other end surface in the circumferential direction of the seal ring is a inclined surface that is inclined so as to guide a foreign matter accumulated in a gap of the separated portion to an outside of the gap.

8 Claims, 14 Drawing Sheets

(56) References Cited

U.S. PATENT DOCUMENTS

| | | | | |
|---|---|---|---|---|
| 7,237,761 | B2* | 7/2007 | Kohlen | F02D 9/08 |
| | | | | 251/306 |
| 7,624,716 | B2* | 12/2009 | Bessho | F02D 9/1015 |
| | | | | 123/337 |
| 8,720,581 | B2* | 5/2014 | Berg | E21B 43/017 |
| | | | | 166/344 |
| 2009/0020099 | A1 | 1/2009 | Bessho et al. | |
| 2017/0227130 | A1 | 8/2017 | Kohlen et al. | |

* cited by examiner

BUTTERFLY VALVE INCLUDING A VALVE BODY, SHAFT, GROOVE PORTION AND SEAL RING

CROSS REFERENCE TO RELATED APPLICATION

The present application is based on Japanese Patent Application No. 2019-14504 filed on Jan. 30, 2019, disclosure of which are incorporated herein by reference.

FIELD

The present disclosure relates to a butterfly valve that adjusts a flow rate of gas flowing in a gas passage.

BACKGROUND

As a butterfly valve that adjusts the flow rate of gas flowing in the gas passage, for example, the butterfly valve is used in, for example, an EGR (Exhaust Gas Recirculation) device that recirculates a part of exhaust gas from an exhaust pipe of an engine to an intake pipe.

SUMMARY

An object of the present disclosure is to provide the butterfly valve which can increase the reliability of valve operation in view of the above aspect.

In order to achieve the above object, the butterfly valve provided in the gas passage includes a valve body, a shaft, a groove portion and a seal ring. The valve body has a substantially disc shape and is provided in the gas passage. The shaft supports the valve body so as to be rotatable in the gas passage. A groove portion is provided at an outer edge portion of the valve body on an outer side in a radial direction so as to extend in a circumferential direction of the valve body. A seal ring is formed in an annular shape, has a separated portion as a cut in a part in the circumferential direction, and is fitted in the groove portion of the valve body. At least one of one end surface in a circumferential direction and the other end surface in the circumferential direction of the seal ring constituting the separated portion is an inclined surface that is inclined so as to guide a foreign matter accumulated in a gap of the separated portion to an outside of the gap when a diameter of the seal ring is reduced.

DETAILED DESCRIPTION

Figure 1:
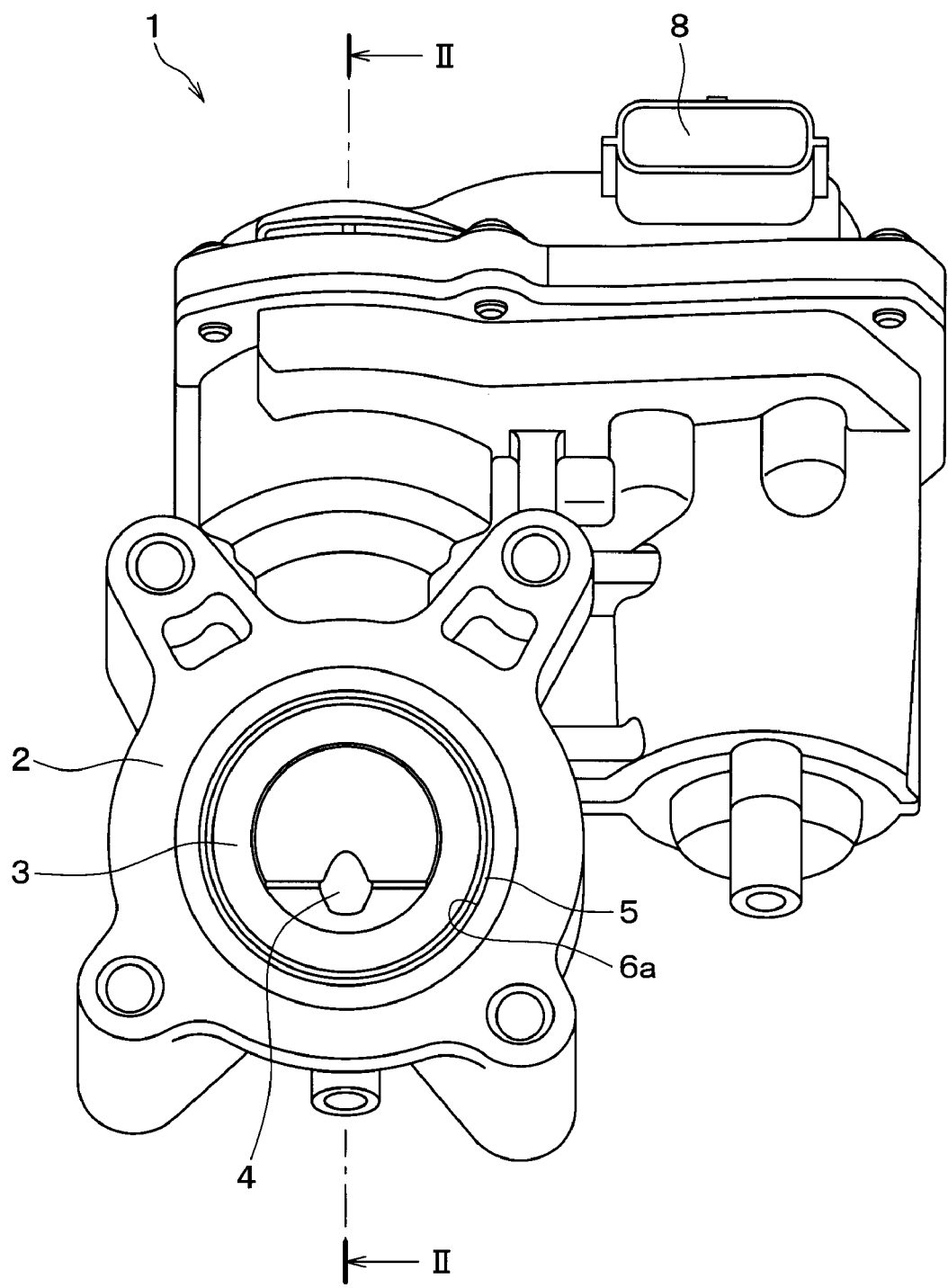
FIG. 1 is a front view showing a state in which a butterfly valve according to a first embodiment closes a gas passage.

Hereinafter, a plurality of embodiments of the present invention will be described with reference to the drawings. In the following embodiments, the same or equivalent parts are denoted by the same reference numerals as each other, and explanations will be provided to the same reference numerals.

First Embodiment

The first embodiment will be described. The butterfly valve of the present embodiment is used in an Exhaust Gas Recirculation (hereinafter, referred to as EGR) device that recirculates a part of exhaust gas from an exhaust pipe of an engine to an intake pipe. The butterfly valve has a function of adjusting a flow rate of the exhaust gas flowing through the EGR passage. This butterfly valve is required to have a so-called closing ability that does not cause exhaust gas leakage when it is in a fully closed state. The closing ability is also referred to as sealing or seal ability.

First, the basic configuration of the butterfly valve will be described.

Figure 2:
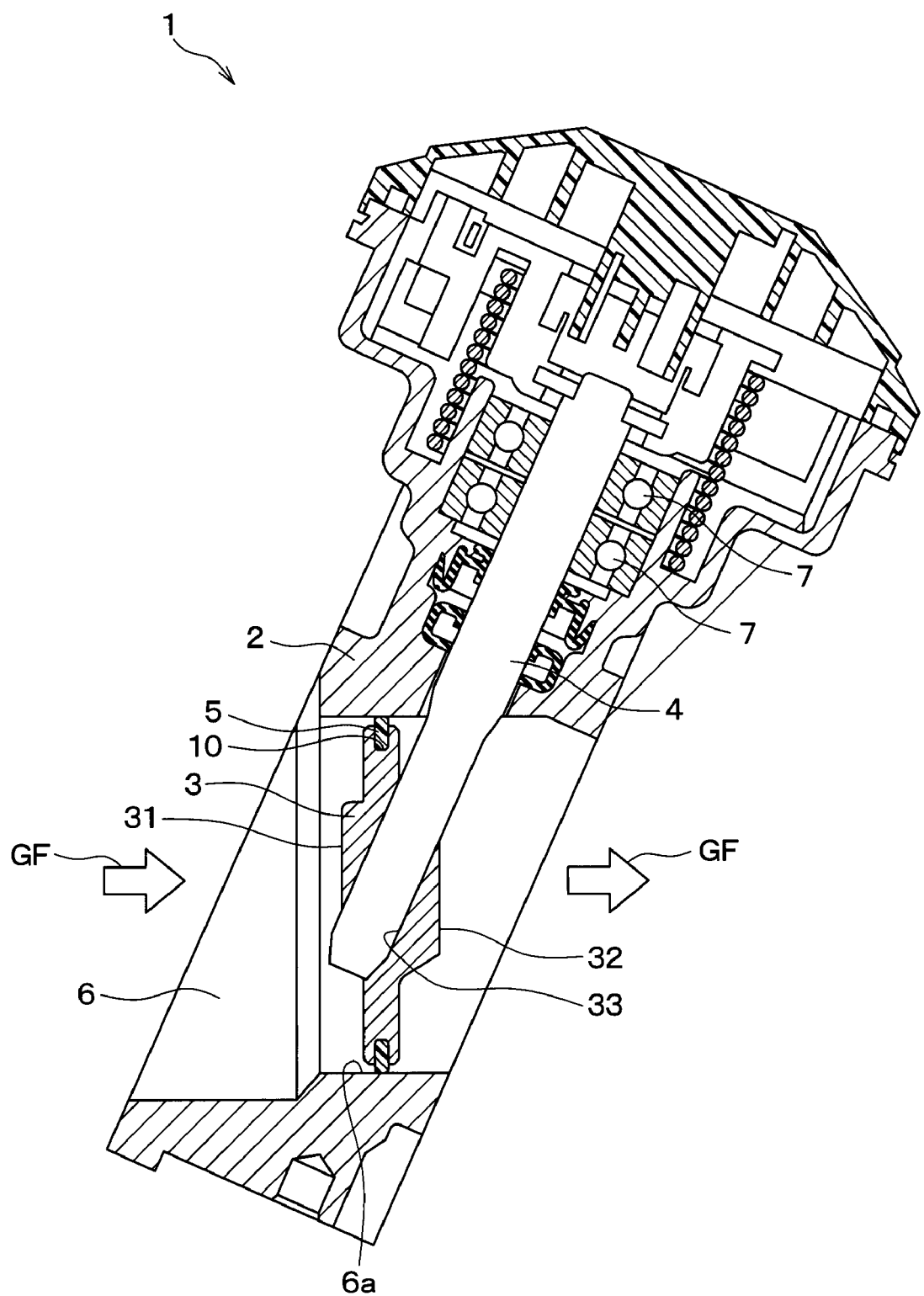
FIG. 2 is a sectional view taken along line II-II in FIG. 1.
Figure 3:
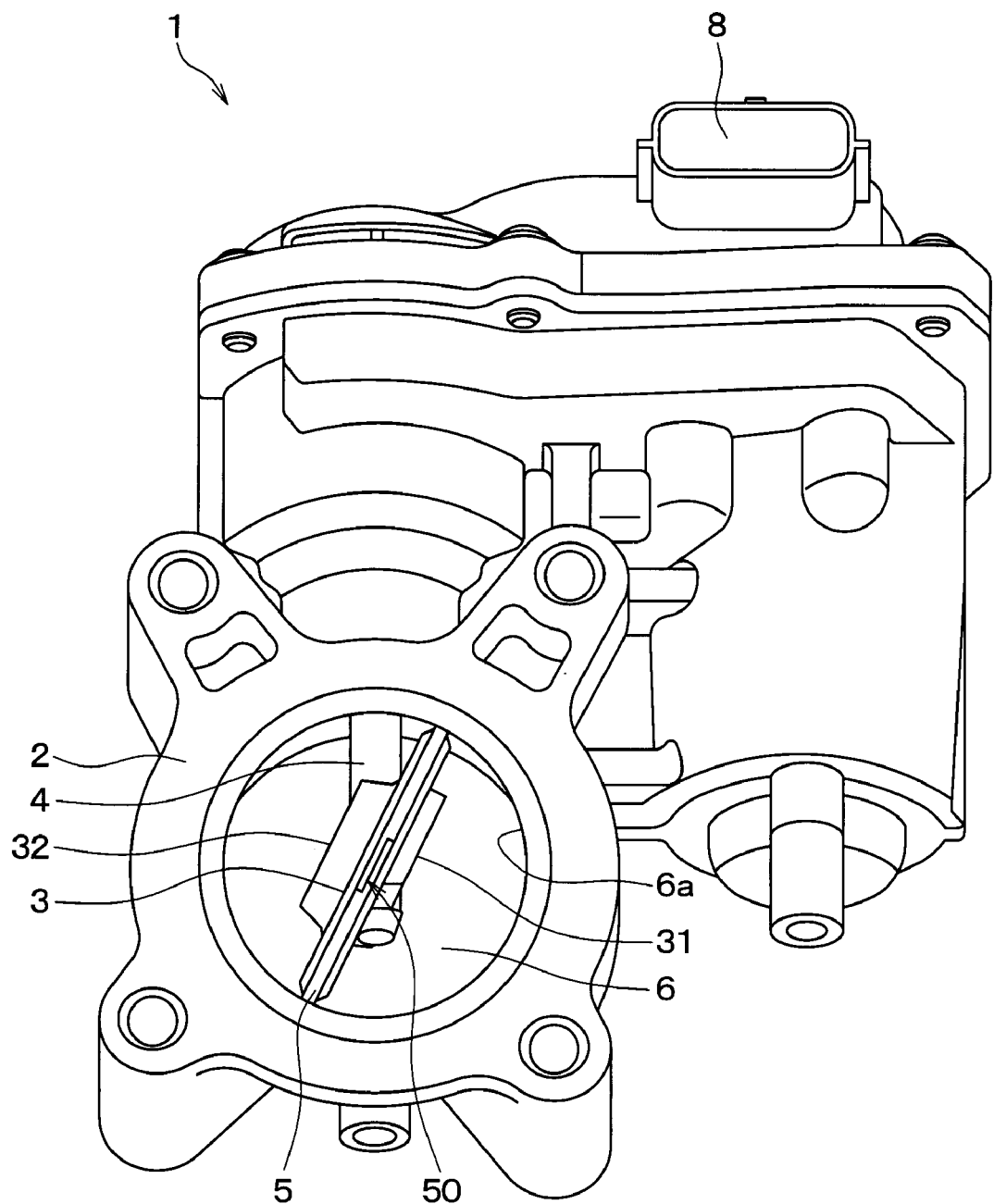
FIG. 3 is a front view showing a state in which a butterfly valve opens a gas passage.

As shown in FIGS. 1 to 3, the butterfly valve 1 includes a housing 2, a valve body 3, a shaft 4, a seal ring 5, and the like.

The housing 2 has a gas passage 6. The gas passage 6 is formed in a substantially cylindrical shape. A cylindrical nozzle (not shown) may be provided inside the gas passage 6. In that case, an inner wall of the nozzle becomes an inner wall of the gas passage 6. The gas passage 6 communicates with an EGR passage (not shown) constituting a part of the EGR device. Therefore, the exhaust gas flowing through the EGR passage flows through the gas passage 6. In the following description, the exhaust gas may be simply referred to as "gas".

A drive device (not shown) that rotates the valve body 3 provided in the gas passage 6 is provided inside the housing 2. The drive device includes a motor (not shown), a gear (not shown) that decelerates and transmits a rotation of the motor to the shaft 4, the shaft 4 connected to the gear, and the like. The shaft 4 is rotatably supported with respect to the housing 2 via a bearing 7.

The valve body 3 is formed in a substantially disc shape and is provided in the gas passage 6. The valve body 3 includes a shaft mounting hole 33 that penetrates obliquely from one surface 31 in the axial direction of the valve body 3 toward the other surface 32. The end of the shaft 4 is fixed to the shaft mounting hole 33. Thereby, the shaft 4 supports the valve body 3 so as to be rotatable in the gas passage 6. A groove portion 10 is provided on the outer edge portion of the valve body 3 on the outer side in the radial direction. The groove portion 10 extends over an entire circumference in a circumferential direction of the valve body 3. The seal ring 5 is fitted into the groove portion 10 of the valve body 3. The seal ring 5 will be described in detail later.

When electric power is supplied to the motor in the housing 2 from a connector 8 provided on an upper portion of the housing 2 and the motor rotates, torque of the motor is transmitted to the shaft 4 through the gear. Thereby, the shaft 4 rotates around its axis. As the shaft 4 rotates, the valve body 3 rotates in the gas passage 6. FIG. 1 and FIG. 2 show a state where the valve body 3 closes the gas passage 6 (that is, a fully closed state). On the other hand, FIG. 3 shows a state in which the valve body 3 opens the gas passage 6. In FIG. 2, the direction in which the gas flows in the gas passage 6 is indicated by an arrow GF.

Next, the seal ring 5 provided in the butterfly valve 1 of the present embodiment will be described in detail.

Figure 4:
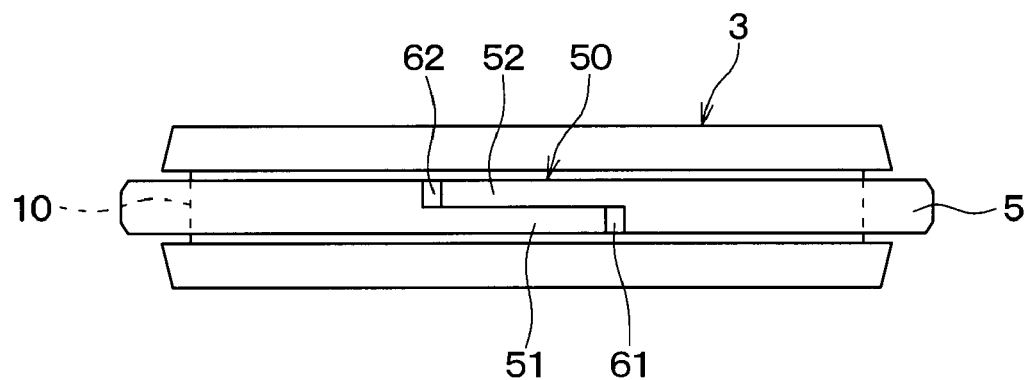
FIG. 4 is a side view of a valve body and a seal ring included in the butterfly valve.
Figure 5:
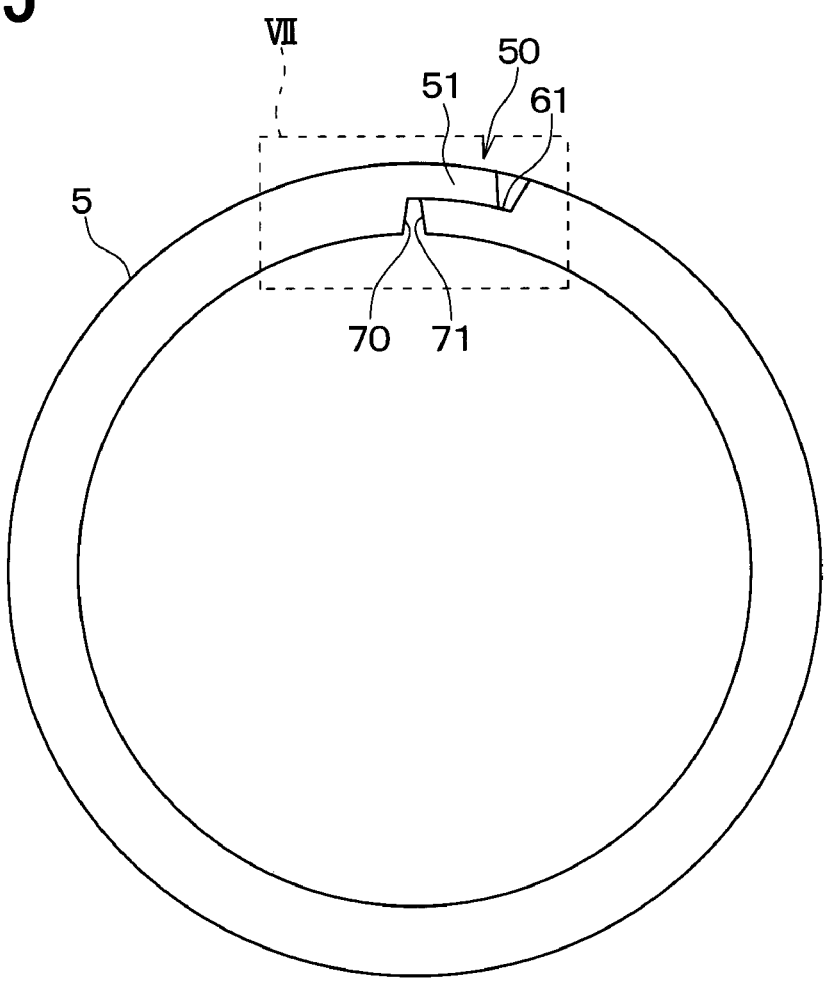
FIG. 5 is a front view of a seal ring provided in the butterfly valve.

FIG. 4 is a side view showing the valve body 3 and the seal ring 5. FIG. 5 is a front view showing only the seal ring 5. In addition, the seal ring 5 of the present embodiment is formed with resin, for example. The seal ring 5 may be configured by a combination of resin and metal.

As shown in FIGS. 4 and 5, the seal ring 5 is formed in an annular shape and is fitted in the groove portion 10 of the valve body 3. The seal ring 5 has a separated portion 50 as a cut in a part of the seal ring 5 in the circumferential direction.

Figure 6:
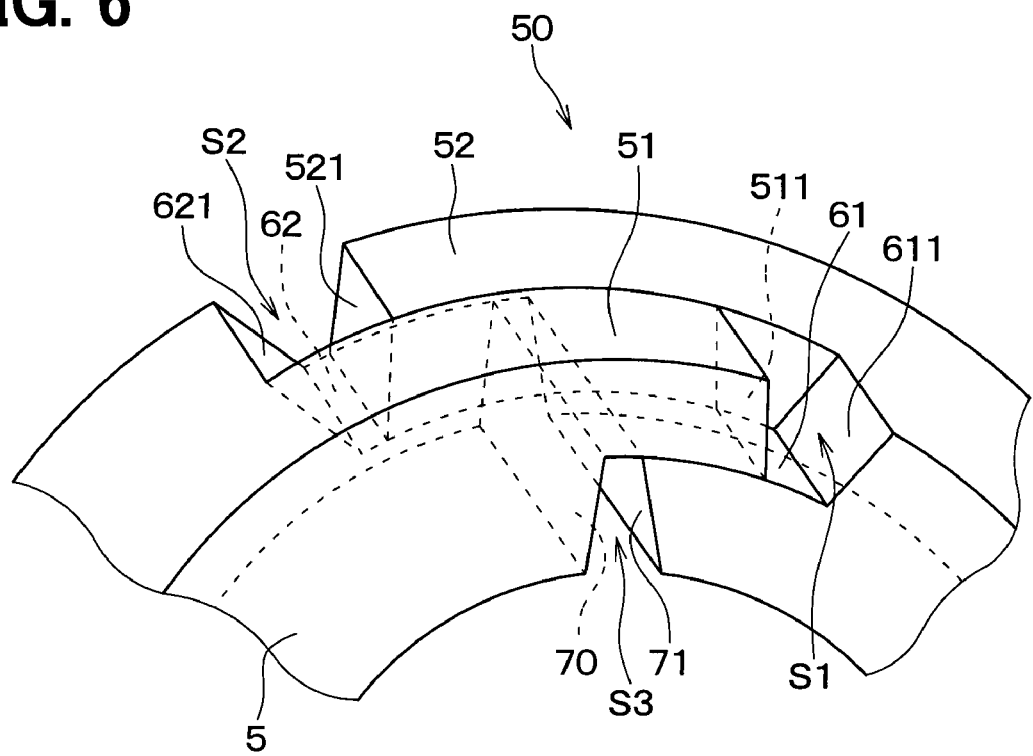
FIG. 6 is a perspective view showing a separated portion of the seal ring.
Figure 7:
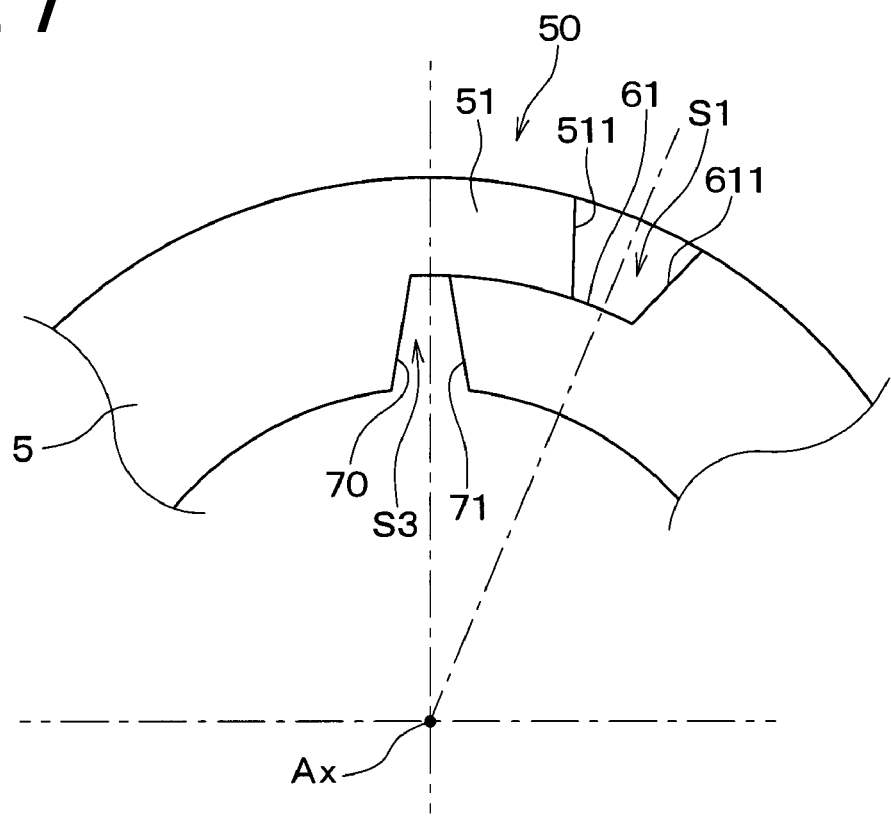
FIG. 7 is an enlarged view of a portion VII of FIG. 5.

As shown in FIGS. 6 and 7, the separated portion 50 of the seal ring 5 of the present embodiment is formed in a so-called step cut shape. The step cut shape is a shape in which protrusion extending in the circumferential direction from one end in the circumferential direction of the seal ring 5 constituting the separated portion 50 (hereinafter referred to as "one end of the separated portion 50") fit into recess provided at the other end in the circumferential direction of the seal ring 5 constituting the separated portion 50 (hereinafter referred to as "the other end portion of the separated portion 50"). Specifically, a first protrusion 51 is provided at one part of an outer side in the radial direction and one side in the axial direction in one end of the separated portion 50, and is extended in the other side in the circumferential direction. The first protrusion 51 is fitted into a first recess 61 provided at the other end of the separated portion 50. A second protrusion 52 is provided at other part of the outer side in the radial direction and other side in the axial direction in other end of the separated portion 50, and is extended in an one side in the circumferential direction. The second protrusion 52 is fitted into a second recess 62 provided at the one end of the separated portion 50.

FIGS. 6 and 7 show the separated portion 50 of the seal ring 5 in a state where the butterfly valve 1 closes the gas passage 6. In FIG. 7, a position of an axis of the seal ring is shown with a symbol Ax. The symbol Ax applies to each drawing referred to in second to seventh embodiments described later.

As shown in FIGS. 6 and 7, in the first embodiment, an end surface 511 in the circumferential direction of the first protrusion 51 is an inclined surface which is inclined with respect to a line segment connecting a center of a gap S1 formed by the end surface 511 and the axis Ax of the seal ring 5. Further, an end surface 611 in the circumferential direction of the first recess 61 is also an inclined surface which is inclined with respect to the line segment connecting the center of the gap S1 formed by the end surface 611 and the axis Ax of the seal ring 5. In the following description, the direction in which the line segment connecting the center of the predetermined gap of the separated portion 50 and the axis Ax of the seal ring 5 extends may be referred to as "predetermined radial direction". That is, in the state where the butterfly valve 1 closes the gas passage 6, the end surface 511 in the circumferential direction of the first protrusion 51 and the end surface 611 in the circumferential direction of the first recess 61 are both the inclined surfaces inclined with respect to the predetermined radial direction of the seal ring 5.

In addition, these inclined surfaces are inclined so that the gap S1 of the separated portion 50 increases from the inner side in the radial direction to the outer side in the radial direction.

As shown in FIG. 6, an end surface 521 in the circumferential direction of the second protrusion 52 is an inclined surface which is inclined with respect to a line segment connecting a center of a gap S2 formed by the end surface 521 and the axis Ax of the seal ring 5. Further, an end surface 621 in the circumferential direction of the second recess 62 is also an inclined surface which is inclined with respect to the line segment connecting the center of the gap S2 formed by the end surface 621 and the axis Ax of the seal ring 5. That is, in the state where the butterfly valve 1 closes the gas passage 6, the end surface 521 in the circumferential direction of the second protrusion 52 and the end surface 621 in the circumferential direction of the second recess 62 are both the inclined surfaces inclined with respect to the predetermined radial direction of the seal ring 5. In addition, these inclined surfaces are inclined so that the gap S2 of the separated portion 50 increases from the inner side in the radial direction to the outer side in the radial direction.

Furthermore, as shown in FIGS. 6 and 7, an end surface 70 of an inner part in the radial direction of one end of the separated portion 50 also is an inclined surface inclined with respect to a line segment connecting a center of a gap S3 formed by the end surface 70 and the axis Ax of the seal ring 5. Further, an end surface 71 of an inner part in the radial direction of the other end of the separated portion 50 is also an inclined surface inclined with respect to the line segment connecting the center of the gap S3 formed by the end surface 71 and the axis Ax of the seal ring 5. That is, in a state where the butterfly valve 1 closes the gas passage 6, the end surface 70 of the inner part in the radial direction of one end of the separated portion 50 and the end surface 71 of the inner part in the radial direction of the other end of the separated portion 50 are both the inclined surfaces with respect to the predetermined radial direction of the seal ring 5. In addition, these inclined surfaces are inclined so that the gap S3 of the separated portion 50 increases from the inner side in the radial direction to the outer side in the radial direction.

Next, in the butterfly valve 1 of the present embodiment, the reason why the end surface in the circumferential direction of the seal ring 5 constituting the separated portion 50 is an inclined surface will be described with reference to FIGS. 8 to 11.

Figure 8:
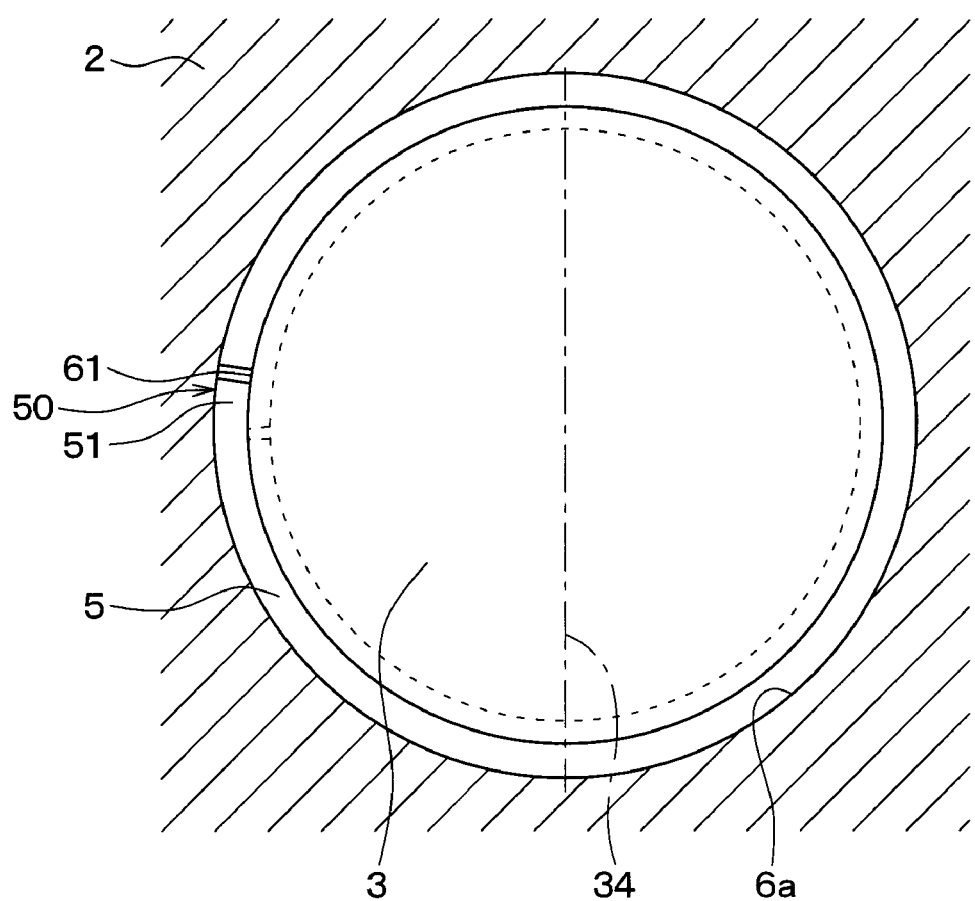
FIG. 8 is an explanatory view showing a state in which the butterfly valve closes the gas passage.
Figure 9:
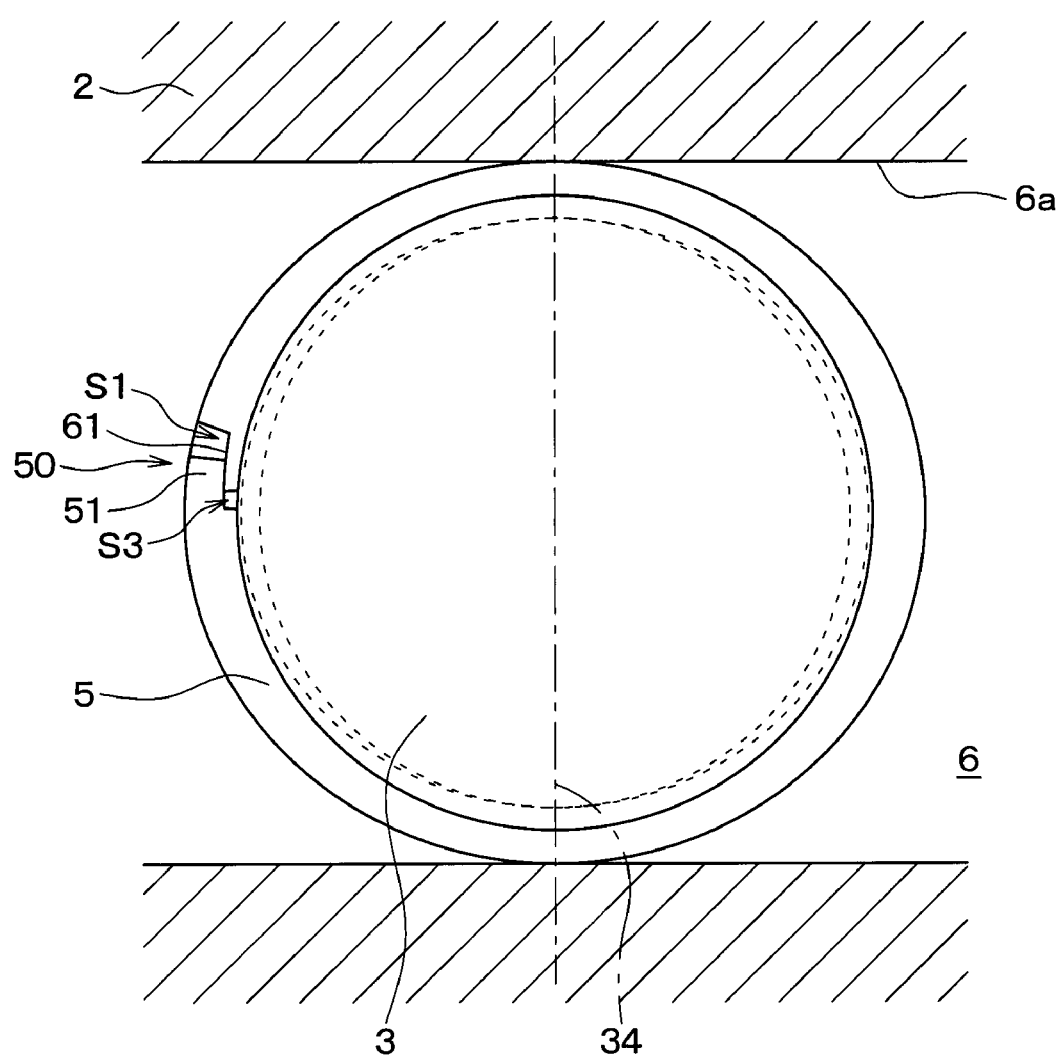
FIG. 9 is an explanatory view showing a state in which the butterfly valve opens the gas passage.

FIG. 8 shows a state where the butterfly valve 1 closes the gas passage 6. On the other hand, FIG. 9 shows a state where the butterfly valve 1 opens the gas passage 6. The direction in which the valve body 3 is viewed in the gas passage 6 in FIG. 8 differs by 90° around the rotation axis 34 of the valve body 3 from the direction in which the valve body 3 is viewed in the gas passage 6 in FIG. 9. In FIGS. 8 and 9, the rotation axis 34 of the valve body 3 is indicated by a one-dot chain line.

The seal ring 5 used for the butterfly valve 1 has an elastic force that can be expanded and reduced in a radial direction in order to improve a close contact with an inner wall 6a of the gas passage 6 when the gas passage 6 is fully closed. As shown in FIG. 8, when the butterfly valve 1 fully closes the gas passage 6, the seal ring 5 has an elastic force to expand outward in the radial direction, and is in close contact with the inner wall 6a of the gas passage 6 while the diameter of the seal ring 5 is reduced. At this time, as shown in FIG. 7 and FIG. 8, the plurality of gaps S1 to S3 of the separated portion 50 of the seal ring 5 become small.

Figure 10:
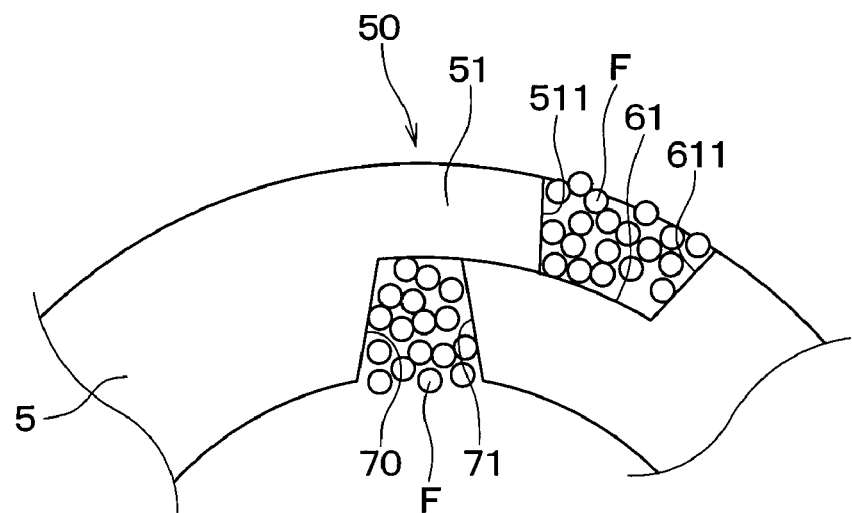
FIG. 10 is an enlarged view showing the separated portion of the seal ring in a state where the butterfly valve opens the gas passage.

On the other hand, as shown in FIG. 9, when the butterfly valve 1 rotates the shaft 4 and the valve body 3 to open the gas passage 6, the diameter of the seal ring 5 is enlarged by the elastic force of the seal ring 5 itself at a location away from a rotation axis 34 of the valve body 3. For this reason, if the separated portion 50 of the seal ring 5 is located away from the rotation axis 34 of the valve body 3, the gaps S1 to S3 of the separated portion 50 become large when the butterfly valve 1 opens the gas passage 6. That is, as shown in FIG. 10, the distance between one end surface of the separated portion 50 and the other end surface is increased. Specifically, the distance between the end surface 511 in the circumferential direction of the first protrusion 51 and the end surface 611 in the circumferential direction of the first recess 61 is increased. Further, the distance between the end surface 521 in the circumferential direction of the second protrusion 52 and the end surface 621 in the circumferential direction of the second recess 62 is increased. Further, the distance between the end surface 70 of the inner part in the radial direction of one end of the separated portion 50 and the end surface 71 of the inner part in the radial direction of the other end of the separated portion 50 is increased.

In this state, the foreign matter F contained in the gas flowing through the gas passage 6 may accumulate in the gaps S1 to S3 of the separated portion 50.

Figure 11:
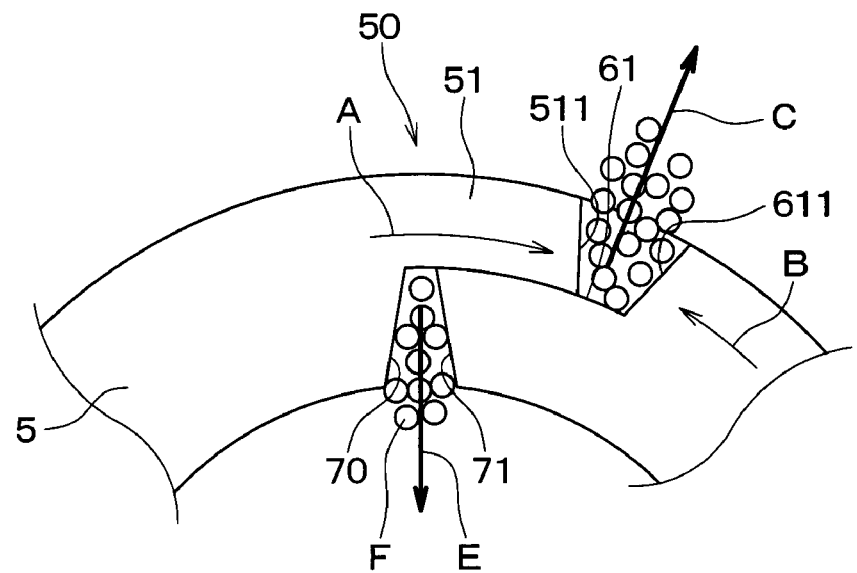
FIG. 11 is an enlarged view showing the separated portion of the seal ring when the butterfly valve shifts from a state in which the gas passage is opened to a state in which the gas passage is closed.

Next, FIG. 11 shows a state where the butterfly valve 1 rotates the shaft 4 and the valve body 3 to close the gas passage 6. At this time, as shown by arrows A and B in FIG. 11, as the diameter of the seal ring 5 decreases, one end of the separated portion 50 approaches the other end of the separated portion 50, and the gaps S1 to S3 of the separated portion 50 become gradually smaller. At this time, in the present embodiment, when the butterfly valve 1 closes the gas passage 6, the foreign matters F accumulated in the gaps S1 to S3 of the separated portion 50 is guided to the inclined surface and discharged out of the gaps S1 to S3.

Specifically, as shown by an arrow C, the foreign matter F accumulated in the gap S1 between the end surface 511 in the circumferential direction of the first protrusion 51 and the end surface 611 in the circumferential direction of the first recess 61 is guided along the inclined surface, and then, is discharged to the outside in the radial direction of the seal ring 5. Although not shown, the foreign matter F accumulated in the gap S2 between the end surface 521 in the circumferential direction of the second protrusion 52 and the end surface 621 in the circumferential direction of the second recess 62 is also guided along the inclined surface and is discharged to the outside in the radial direction of the seal ring 5. Moreover, as shown by the arrow E, the foreign matter F accumulated in the gap S3 between the end surface 70 of the inner part in the radial direction of one end of the separated portion 50 and the end surface 71 of the inner part in the radial direction of the other end of the separated portion 50 is also guided along the inclined surface and is discharged to the outside in the radial direction of the seal ring 5.

Therefore, in the present embodiment, the foreign matter F is prevented from clogging in the plurality of gaps S1 to S3 of the separated portion 50 of the seal ring 5, so that the butterfly valve 1 rotates the shaft 4 and reliably fully closes the gas passage 6.

Here, in order to compare with the butterfly valve 1 of the first embodiment, a butterfly valve of a comparative example will be described with reference to FIGS. 12 and 13.

Figure 12:
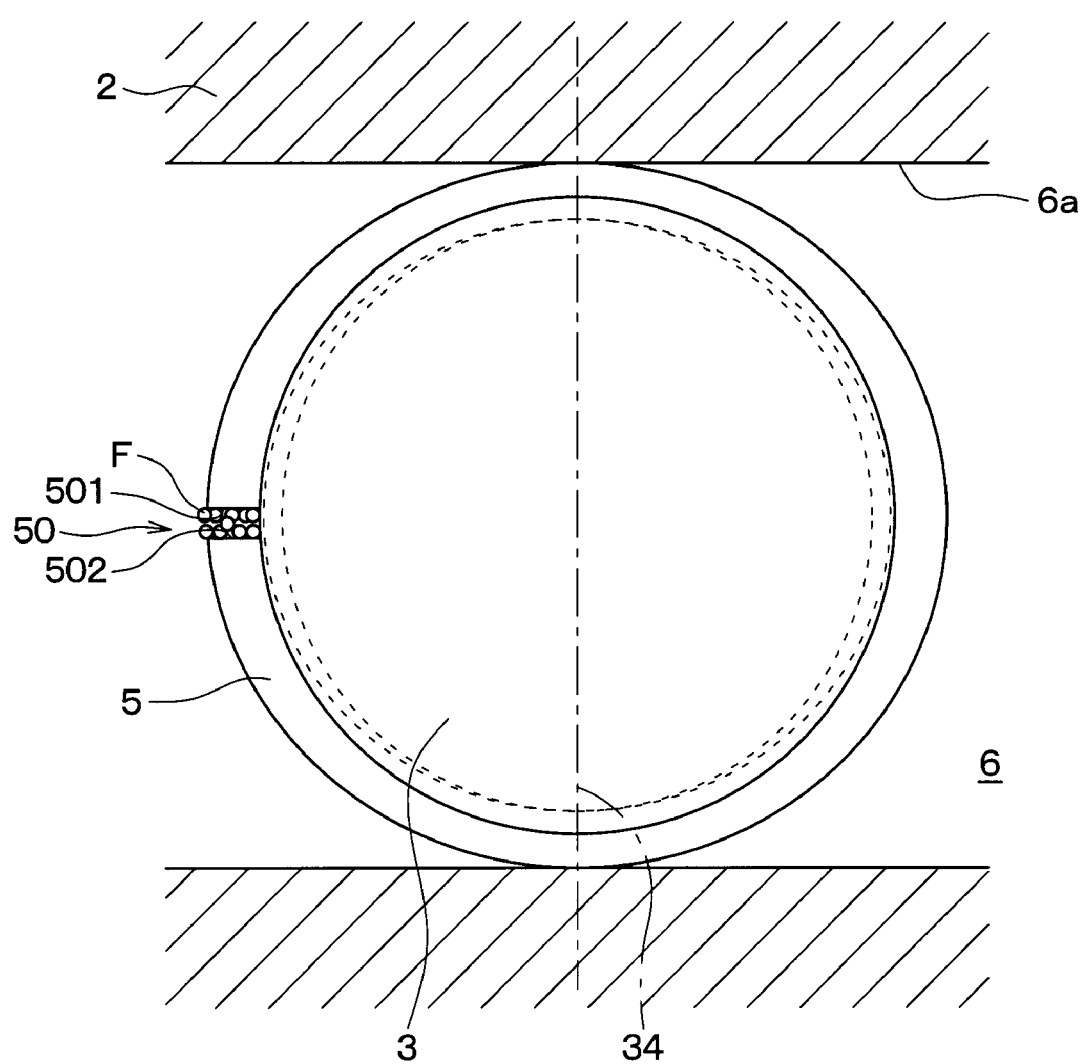
FIG. 12 is an explanatory diagram showing a state in which a butterfly valve of a comparative example opens the gas passage.

FIG. 12 shows a state where the butterfly valve 1 opens the gas passage 6. In the comparative example, one end surface 501 and the other end surface 502 of the separated portion 50 of the seal ring 5 included in the butterfly valve are formed in parallel. That is, neither one end surface 501 nor the other end surface 502 of the separated portion 50 of the seal ring 5 is an inclined surface. In the present specification, "parallel" includes a state in which an angle formed by one end surface and the other end surface constituting the separated portion 50 is slightly changed, as the diameter of the seal ring 5 changes from the state where the butterfly valve opens the gas passage 6 to the state where the butterfly valve closes it.

As shown in FIG. 12, also in the comparative example, in the state where the butterfly valve opens the gas passage 6, the diameter of the seal ring 5 is expanding due to the elastic force of the seal ring 5 itself at a place away from the rotation axis 34 of the valve body 3. Therefore, in this state, the gap of the separated portion 50 becomes large, and the foreign matter F contained in the gas flowing through the gas passage 6 may accumulate in the gap of the separated portion 50.

Figure 13:
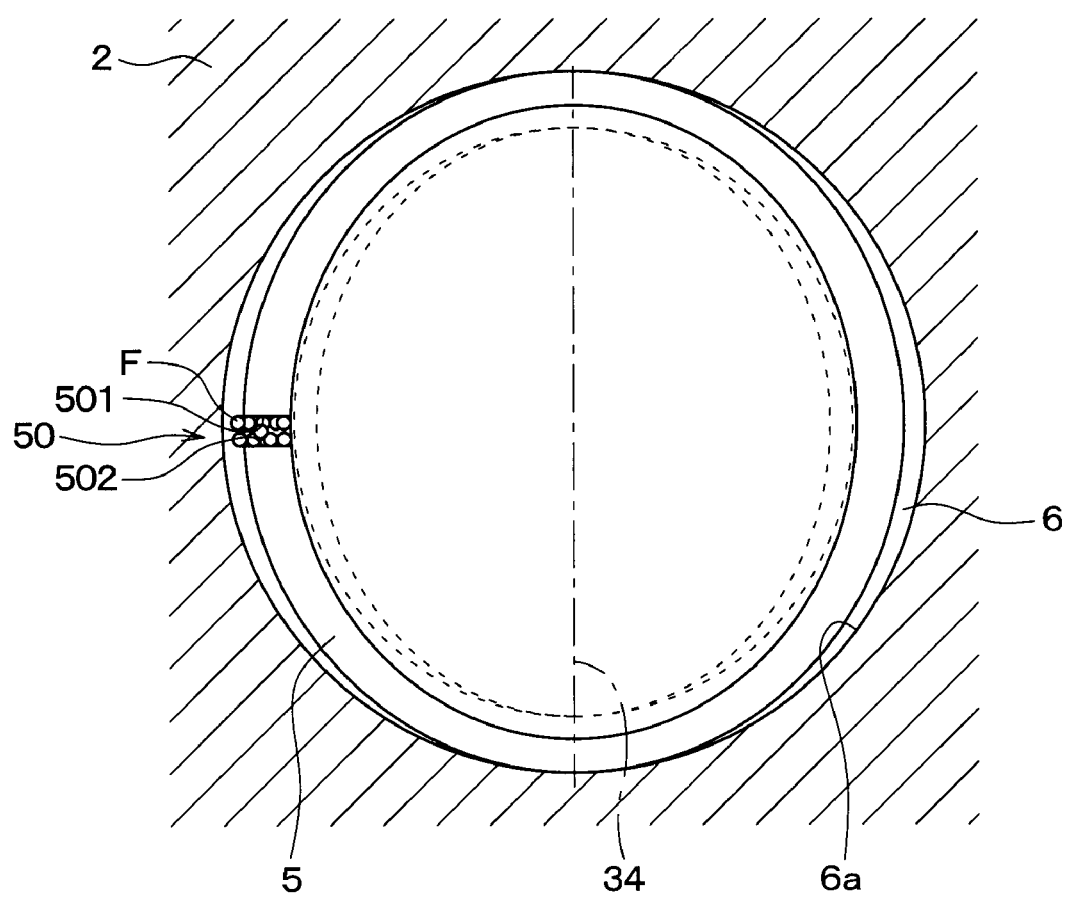
FIG. 13 is an explanatory diagram showing a state immediately before the butterfly valve of the comparative example closes the gas passage.

Next, FIG. 13 shows a state immediately before the butterfly valve of the comparative example rotates the shaft 4 and the valve body 3 and closes the gas passage 6. At this time, as shown in FIG. 13, as the diameter of the seal ring 5 is reduced, the one end surface 501 and the other end surface 502 of the separated portion 50 approach each other, and the gap between the separated portions 50 is gradually reduced. However, in the comparative example, it is conceivable that the foreign matter F accumulated in the gap of the separated portion 50 is clogged in the gap of the separated portion 50 without being discharged from the gap. At that time, if it becomes difficult for a drive device of the butterfly valve to rotate the shaft 4, the gas passage 6 cannot be fully closed, and the butterfly valve results in malfunction.

In contrast to the comparative example described above, the butterfly valve 1 of the first embodiment has the following effects.

(1) In the first embodiment, one end surface and the other end surface of the seal ring 5 constituting the separated portion 50 are the inclined surfaces. Therefore, when the diameter of the seal ring 5 is reduced, the inclined surface is inclined so that the foreign matters F accumulated in the gaps S1 to S3 of the separated portion 50 are guided outside the gaps S1 to S3.

Thus, the foreign matters F accumulated in the gaps S1 to S3 of the separated portion 50 when the butterfly valve 1 opens the gas passage 6 is guided along the inclined surface and discharged from the gaps S1 to S3 as the diameter of the seal ring 5 is reduced, when the butterfly valve 1 closes the gas passage 6. Therefore, the foreign matter F is prevented from clogging in the plurality of gaps S1 to S3 of the separated portion 50 of the seal ring 5, so that the butterfly valve 1 rotates the shaft 4 and reliably fully closes the gas passage 6. Therefore, the butterfly valve 1 can prevent the valve from malfunctioning and can improve the reliability of the valve operation.

(2) In the first embodiment, the inclined surface constituting the separated portion 50 is inclined so that the gaps S1 to S3 of the separated portion 50 increase from the inner side in the radial direction to the outer side in the radial direction, or from the outer side in the radial direction to the inner side in the radial direction.

As a result, the foreign matters F accumulated in the gaps S1 to S3 of the separated portion 50 when the butterfly valve 1 opens the gas passage 6 can be discharged along the inclined surface radially outward or radially inward of the seal ring 5, as the diameter of the seal ring 5 is reduced when the butterfly valve 1 closes the gas passage 6.

(3) In the first embodiment, the separated portion 50 of the seal ring 5 has a step cut shape. In this case, there is a concern that the gaps S1 to S3 of the separated portion 50 are formed at a plurality of locations, and the risk that the foreign matters F are clogged in the gaps S1 to S3 increases. Therefore, in the first embodiment, the end surface 511 in the circumferential direction of the first protrusion 51 and the end surface 611 in the circumferential direction of the first recess 61 that form the step cut shape of the seal ring 5 are both the inclined surfaces inclined with respect to the predetermined radial direction of the seal ring 5. The end surface 521 in the circumferential direction of the second protrusion 52 and the end surface 621 in the circumferential direction of the second recess 62 are also inclined surfaces that are inclined with respect to the predetermined radial direction of the seal ring 5. These inclined surfaces are inclined so that the gaps S1, S2 of the separated portion 50 increases from the inner side in the radial direction to the outer side in the radial direction.

Further, the end surface 70 of the inner part in the radial direction of one end of the separated portion 50 and the end surface 71 of the inner part in the radial direction of the other end of the separated portion 50 are both the inclined surfaces with respect to the predetermined radial direction of the seal ring 5. These inclined surfaces are inclined so that the gap S3 of the separated portion 50 increases from the inner side in the radial direction to the outer side in the radial direction.

As a result, in the butterfly valve 1, even when the separated portion 50 of the seal ring 5 has a step cut shape, it is possible to discharge the foreign matters F accumulated in the gaps S1 to S3 of the separated portion 50 along the inclined surface in the radial direction of the seal ring 5, as the diameter of the seal ring 5 is reduced. Therefore, the butterfly valve 1 can improve the closing ability when the gas passage 6 is fully closed, and can improve the reliability of the valve operation.

Second Embodiment

A second embodiment will be described with reference to FIG. 14. The second embodiment is similar to the first embodiment except for the configuration of the separated portion 50 of the seal ring 5 modified from the corresponding configuration of the first embodiment. Accordingly, only parts different from the corresponding parts of the first embodiment are herein described.

Figure 14:
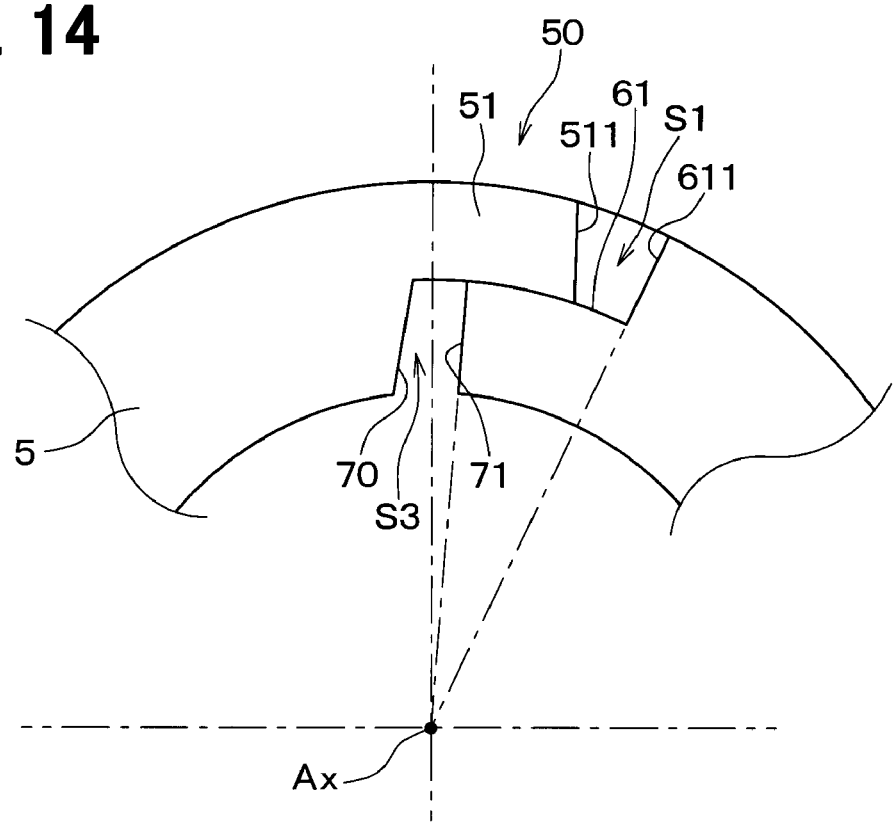
FIG. 14 is an enlarged view showing a separated portion of a seal ring provided in a butterfly valve according to a second embodiment.

As shown in FIG. 14, also in the second embodiment, the end surface 511 in the circumferential direction of the first protrusion 51 constituting the step cut shape of the seal ring 5 is the inclined surface inclined with respect to the line segment that connects the center of the gap S1 formed by the end surface 511 and the axis Ax of the seal ring 5. The inclined surface is inclined so that the gap S1 of the separated portion 50 increases from the inner side in the radial direction to the outer side in the radial direction. On the other hand, the end surface 611 in the circumferential direction of the first recess 61 is a surface parallel to the line segment connecting the end surface 611 and the axis Ax of the seal ring 5.

Further, an end surface 70 of an inner part in the radial direction of one end of the separated portion 50 is an inclined surface inclined with respect to the line segment connecting the center of the gap S3 formed by the end surface 70 and the axis Ax of the seal ring 5. The inclined surface is inclined so that the gap S3 of the separated portion 50 increases from the inner side in the radial direction to the outer side in the radial direction.

On the other hand, the end surface 71 of the inner part in the radial direction of the other end portion of the separated portion 50 is a surface parallel to a line segment connecting the end surface 71 and the axis Ax of the seal ring 5.

In the second embodiment described above, one end surface of the seal ring 5 constituting the separated portion 50 is the inclined surfaces. Therefore, when the diameter of the seal ring 5 is reduced, the inclined surface is inclined so that the foreign matters F accumulated in the gaps S1 to S3 of the separated portion 50 are guided outside the gaps S1 to S3. Therefore, the second embodiment can also exhibit the same operation and effects as those of the first embodiment.

Third Embodiment

A third embodiment will be described with reference to FIG. 15. The third embodiment is similar to the first embodiment except for the configuration of the separated portion 50 of the seal ring 5 modified from the corresponding configuration of the first embodiment. Accordingly, only parts different from the corresponding parts of the first embodiment are herein described.

Figure 15:
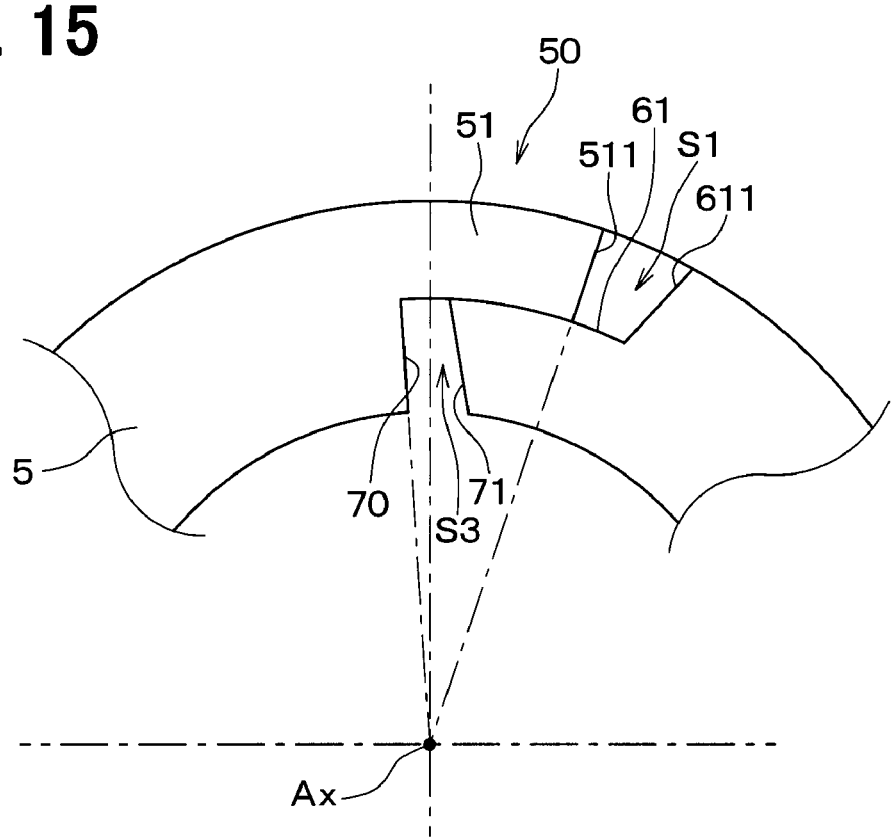
FIG. 15 is an enlarged view showing a separated portion of a seal ring provided in a butterfly valve according to a third embodiment.

As shown in FIG. 15, in the third embodiment, the end surface 511 in the circumferential direction of the first protrusion 51 constituting the step cut shape of the seal ring 5 is surface parallel to a line segment connecting the end surface 511 and the axis Ax of the seal ring 5. On the other hand, an end surface 611 in the circumferential direction of the first recess 61 is also an inclined surface which is inclined with respect to the line segment connecting the center of the gap S1 formed by the end surface 611 and the axis Ax of the seal ring 5. The inclined surface is inclined so that the gap S1 of the separated portion 50 increases from the inner side in the radial direction to the outer side in the radial direction.

In addition, the end surface 70 of the inner part in the radial direction of one end of the separated portion 50 is a surface parallel to a line segment connecting the end surface 70 and the axis Ax of the seal ring 5. On the other hand, an end surface 71 of an inner part in the radial direction of the other end of the separated portion 50 is an inclined surface inclined with respect to the line segment connecting the center of the gap S3 formed by the end surface 71 and the axis Ax of the seal ring 5. The inclined surface is inclined so that the gap S3 of the separated portion 50 increases from the inner side in the radial direction to the outer side in the radial direction.

In the third embodiment described above, the end surface of the seal ring 5 constituting the separated portion 50 is the inclined surfaces. Therefore, when the diameter of the seal ring 5 is reduced, the inclined surface is inclined so that the foreign matters F accumulated in the gaps S1 to S3 of the separated portion 50 are guided outside the gaps S1 to S3. Therefore, the third embodiment can also exhibit the same operation and effects as those of the first embodiment, etc.

Fourth Embodiment

A fourth embodiment will be described with reference to FIGS. 16 and 17. The fourth embodiment is similar to the first embodiment except for the configuration of the separated portion 50 of the seal ring 5 modified from the corresponding configuration of the first embodiment. Accordingly, only parts different from the corresponding parts of the first embodiment are herein described.

Figure 16:
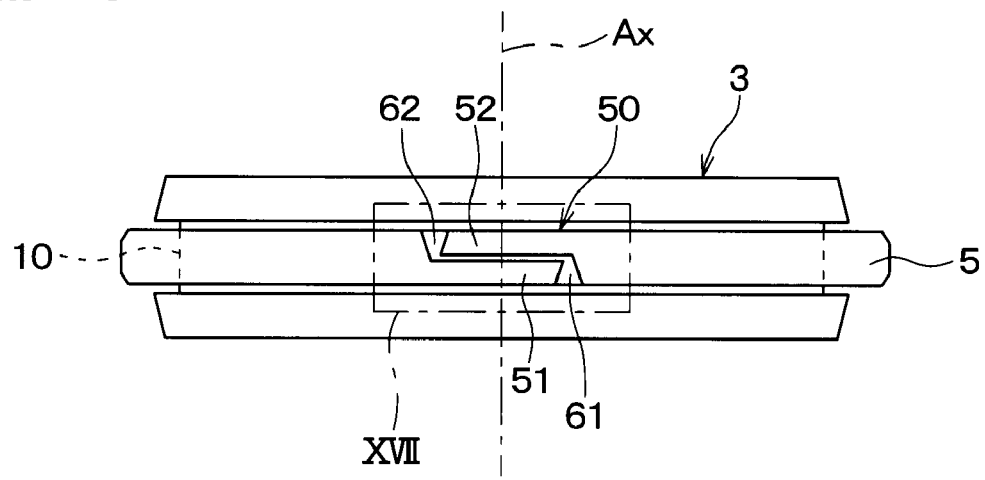
FIG. 16 is a front view of a seal ring provided in a butterfly valve according to a fourth embodiment.

FIG. 16 is a side view of the valve body 3 and the seal ring 5 provided in the butterfly valve 1. FIG. 17 shows the separated portion 50 of the seal ring 5 in the portion XVII of FIG. 16.

Figure 17:
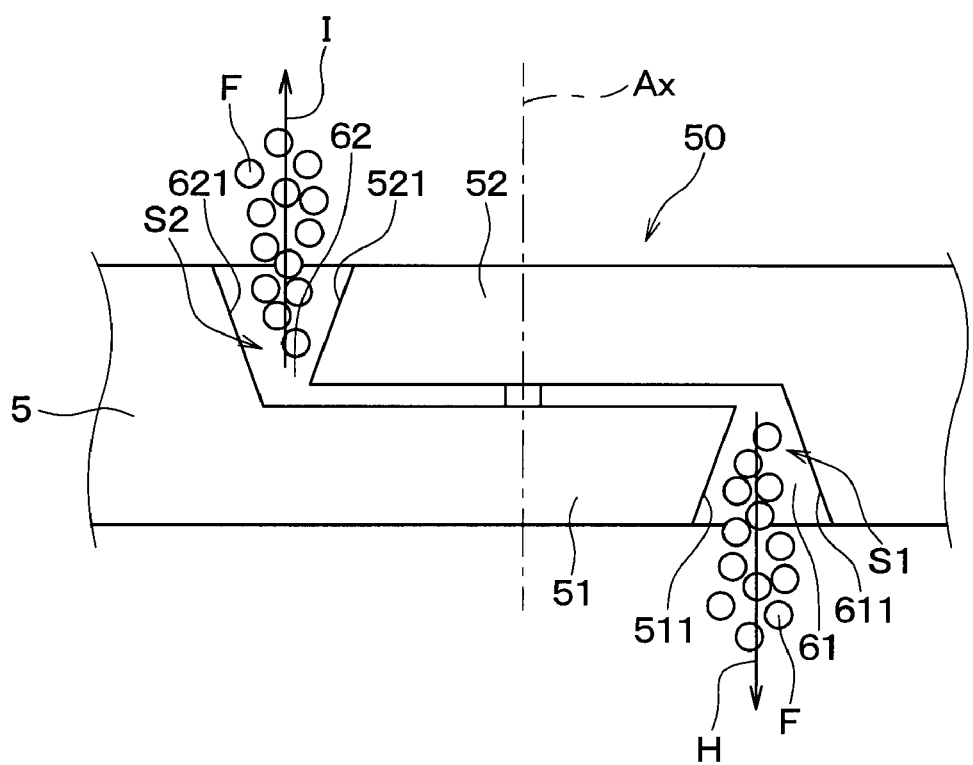
FIG. 17 is an enlarged view showing a separated portion of the seal ring in a portion XVII of FIG. 16.

As shown in FIG. 17, in the fourth embodiment, the end surface 511 in the circumferential direction of the first protrusion 51 and the end surface 611 in the circumferential direction of the first recess 61 that form the step cut shape of the seal ring 5 are both the inclined surfaces inclined with respect to the axis of the seal ring 5. These inclined surfaces are inclined so that the gap S1 of the separated portion 50 increases from the inner side of the seal ring 5 toward the outer side in the axial direction of the seal ring 5.

Further, the end surface 521 in the circumferential direction of the second protrusion 52 and the end surface 621 in the circumferential direction of the second recess 62 are also the inclined surfaces inclined with respect to the axis Ax of the seal ring 5. These inclined surfaces are inclined so that the gap S2 of the separated portion 50 increases from the inner side of the seal ring 5 toward the outer side in the axial direction of the seal ring 5.

In the fourth embodiment, as shown by an arrow H, when the butterfly valve 1 closes the gas passage 6, the foreign matter F accumulated in the gap S1 between the end surface 511 in the circumferential direction of the first protrusion 51 and the end surface 611 in the circumferential direction of the first recess 61 is guided along the inclined surface and discharged to the outside in the axial direction of the seal ring 5. Further, as shown by an arrow, the foreign matter F accumulated in the gap S2 between the end surface 521 in the circumferential direction of the second protrusion 52 and the end surface 621 in the circumferential direction of the second recess 62 is also guided along the inclined surface and is discharged to the outside in the axial direction of the seal ring 5.

Also in the fourth embodiment described above, the foreign matters F are prevented from clogging in the plurality of gaps S1 to S3 of the separated portion 50 of the seal ring 5. Accordingly, it is possible to prevent the valve from malfunctioning and to improve the reliability of the valve operation.

Fifth Embodiment

A fifth embodiment will be described with reference to FIG. 18. The fifth embodiment is similar to the fourth embodiment except for the configuration of the separated portion 50 of the seal ring 5 modified from the corresponding configuration of the fourth embodiment. Accordingly, only parts different from the corresponding parts of the fourth embodiment are herein described.

Figure 18:
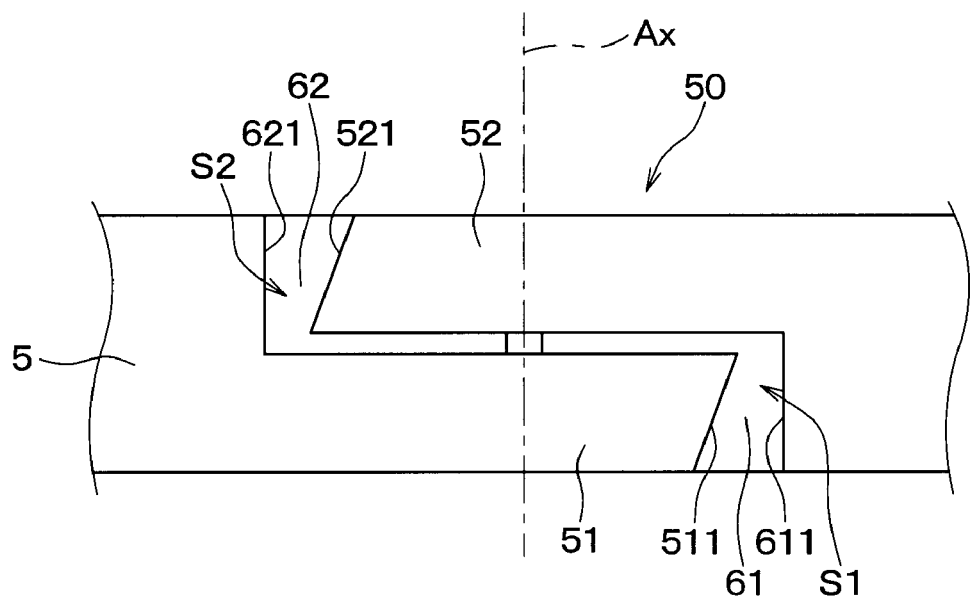
FIG. 18 is an enlarged view showing a separated portion of a seal ring provided in a butterfly valve according to a fifth embodiment.

As shown in FIG. 18, in the fifth embodiment, the end surface 511 in the circumferential direction of the first protrusion 51 that forms the step cut shape of the seal ring 5 is the inclined surface inclined with respect to the axis of the seal ring 5. This inclined surface is inclined so that the gap S1 of the separated portion 50 increases from the inner side of the seal ring 5 toward the outer side in the axial direction of the seal ring 5. On the other hand, the end surface 611 in the circumferential direction of the first recess 61 is a surface parallel to the axis Ax of the seal ring 5.

The end surface 521 in the circumferential direction of the second protrusion 52 is an inclined surface that is inclined with respect to the axis Ax of the seal ring 5. This inclined surface is also inclined so that the gap S2 of the separated portion 50 increases from the inner side of the seal ring 5 toward the outer side in the axial direction of the seal ring 5. On the other hand, the end surface 621 in the circumferential direction of the second recess 62 is a surface parallel to the axis Ax of the seal ring 5.

In the fifth embodiment described above, the end surface of the seal ring 5 constituting the separated portion 50 is the inclined surfaces. Therefore, when the diameter of the seal ring 5 is reduced, the inclined surface is inclined so that the foreign matters F accumulated in the gaps S1 to S3 of the separated portion 50 are guided outside the gaps S1 to S3. Therefore, the fifth embodiment can also exhibit the same operation and effects as those of the first embodiment, etc.

Sixth Embodiment

A sixth embodiment will be described with reference to FIG. 19. The sixth embodiment is similar to the fourth embodiment except for the configuration of the separated portion 50 of the seal ring 5 modified from the corresponding configuration of the fourth embodiment. Accordingly, only parts different from the corresponding parts of the fourth embodiment are herein described.

Figure 19:
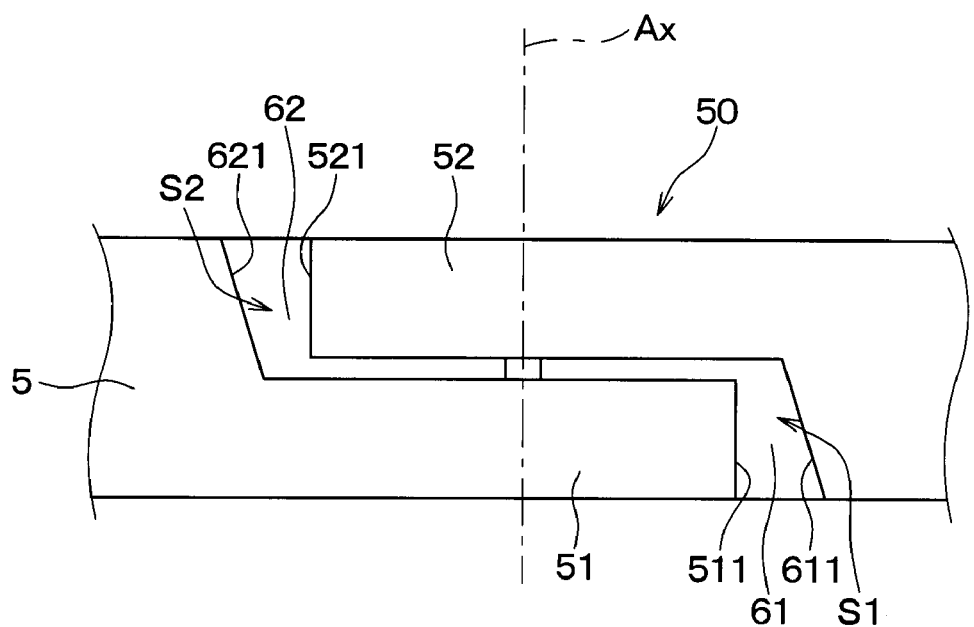
FIG. 19 is an enlarged view showing a separated portion of a seal ring provided in a butterfly valve according to a sixth embodiment.

As shown in FIG. 19, in the sixth embodiment, the end surface 511 in the circumferential direction of the first protrusion 51 that forms the step cut shape of the seal ring 5 is a surface parallel to the axis of the seal ring 5. On the other hand, the end surface 611 in the circumferential direction of the first recess 61 is an inclined surface that is inclined with respect to the axis Ax of the seal ring 5. This inclined surface is inclined so that the gap S1 of the separated portion 50 increases from the inner side of the seal ring 5 toward the outer side in the axial direction of the seal ring 5.

Further, the end surface 521 in the circumferential direction of the second protrusion 52 is a surface parallel to the axis Ax of the seal ring 5. On the other hand, the end surface 621 in the circumferential direction of the second recess 62 is an inclined surface that is inclined with respect to the axis Ax of the seal ring 5. This inclined surface is inclined so that the gap S2 of the separated portion 50 increases from the inner side of the seal ring 5 toward the outer side in the axial direction of the seal ring 5.

Also in the sixth embodiment described above, the end surface of the seal ring 5 constituting the separated portion 50 is the inclined surface. Therefore, when the diameter of the seal ring 5 is reduced, the inclined surface is inclined so that the foreign matters F accumulated in the gaps S1 to S3 of the separated portion 50 are guided outside the gaps S1 to S3. Therefore, the sixth embodiment can also exhibit the same operation and effects as those of the first embodiment, etc.

Seventh Embodiment

A seventh embodiment will be described with reference to FIGS. 20 and 21. The seventh embodiment is a combination of the first embodiment and the fourth embodiment described above.

Figure 20:
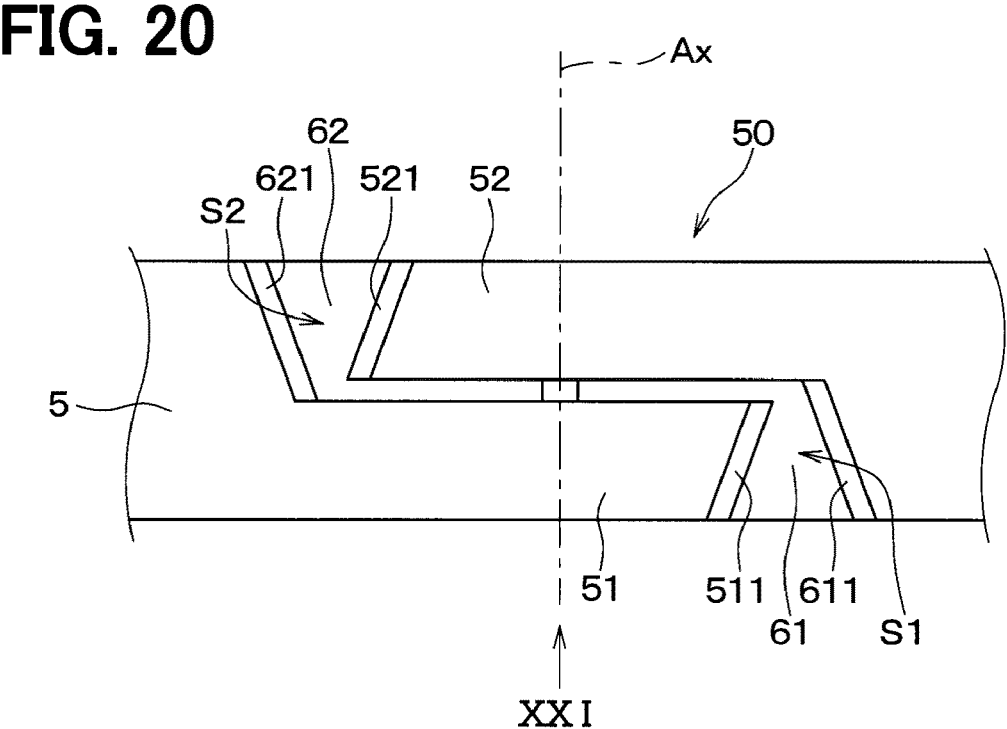
FIG. 20 is an enlarged view showing a separated portion of a seal ring provided in a butterfly valve according to a seventh embodiment.
Figure 21:
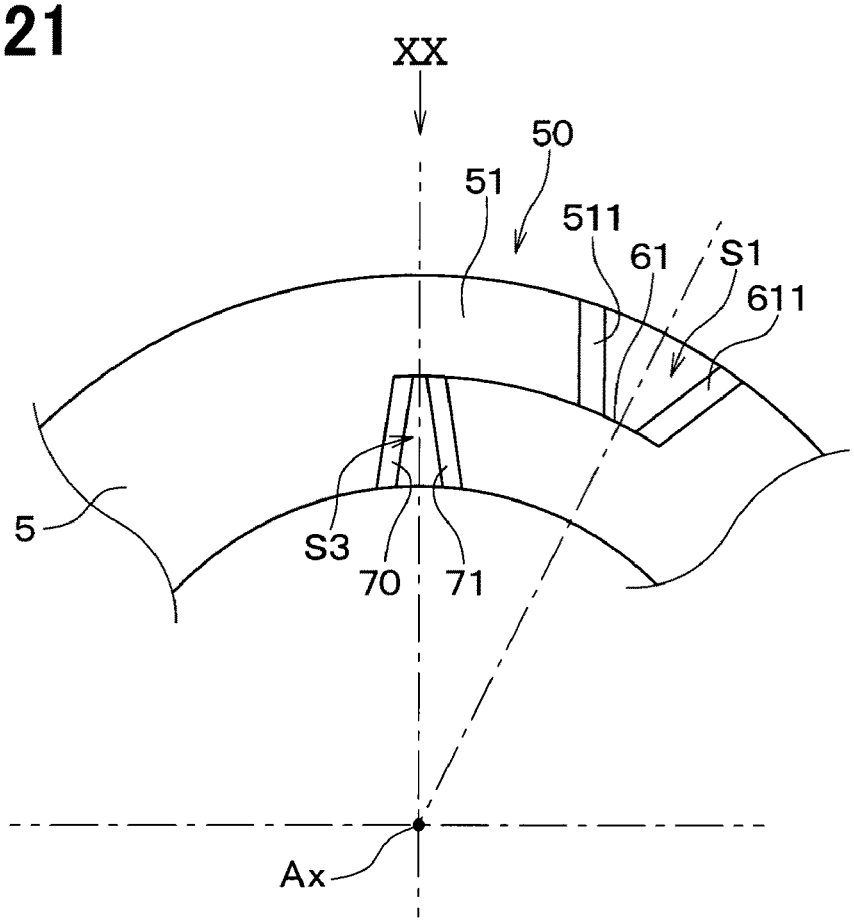
FIG. 21 is an enlarged view showing the separated portion of the seal ring as seen from an arrow view in the XXI direction of FIG. 20.

As shown in FIGS. 20 and 21, in the seventh embodiment, the end surface 511 in the circumferential direction of the first protrusion 51 constituting the step cut shape of the seal ring 5 is an inclined surface with respect to a line segment connecting the center of the gap S1 formed by the end surface 511 and the axis Ax of the seal ring 5, and is an inclined surface inclined with respect to the axis Ax of the seal ring 5. Further, the end surface 611 in the circumferential direction of the first recess 61 is also an inclined surface inclined with respect to a line segment connecting the center of the gap S1 formed by the end surface 611 and the axis Ax of the seal ring 5, and is an inclined surface inclined with respect to the axis Ax of the seal ring 5. These inclined surfaces are inclined so that the gap S1 of the separated portion 50 increases from the inner side in the radial direction to the outer side in the radial direction.

Further, the end surface 521 in the circumferential direction of the second protrusion 52 is also an inclined surface inclined with respect to a line segment connecting the center of the gap S2 formed by the end surface 521 and the axis Ax of the seal ring 5, and is an inclined surface inclined with respect to the axis Ax of the seal ring 5. Further, the end surface 621 in the circumferential direction of the second recess 62 is also an inclined surface inclined with respect to a line segment connecting the center of the gap S2 formed by the end surface 621 and the axis Ax of the seal ring 5, and is an inclined surface inclined with respect to the axis Ax of the seal ring 5. These inclined surfaces are inclined so that the gap S2 of the separated portion 50 increases from the inner side in the radial direction to the outer side in the radial direction.

Further, the end surface 70 in the inner part in the radial direction of one end of the separated portion 50 is an inclined surface inclined with respect to a line segment connecting the center of the gap S3 formed by the end surface 70 and the axis Ax of the seal ring 5, and is an inclined surface inclined with respect to the axis Ax of the seal ring 5. The end surface 71 in the inner part in the radial direction of the other end of the separated portion 50 is an inclined surface inclined with respect to a line segment connecting the center of the gap S3 formed by the end surface 71 and the axis Ax of the seal ring 5, and is an inclined surface inclined with respect to the axis Ax of the seal ring 5. These inclined surfaces are inclined so that the gap S3 of the separated portion 50 increases from the outer side in the radial direction to the inner side in the radial direction.

Also in the seventh embodiment described above, the end surface of the seal ring 5 constituting the separated portion 50 is the inclined surfaces. Therefore, when the diameter of the seal ring 5 is reduced, the inclined surface is inclined so that the foreign matters F accumulated in the gaps S1 to S3 of the separated portion 50 are guided outside the gaps S1 to S3. Therefore, the seventh embodiment can also exhibit the same operation and effects as those of the first embodiment, etc.

Other Embodiments

The present invention is not limited to the above embodiments, and can be appropriately modified within the scope described in the claims. The embodiments described above are not independent of each other, and can be appropriately combined except when the combination is obviously impossible. The constituent element(s) of each of the above embodiments is/are not necessarily essential unless it is specifically stated that the constituent element(s) is/are essential in the above embodiment, or unless the constituent element(s) is/are obviously essential in principle. A quantity, a value, an amount, a range, or the like referred to in the description of the embodiments described above is not necessarily limited to such a specific value, amount, range or the like unless it is specifically described as essential or understood as being essential in principle. Furthermore, a shape, positional relationship or the like of a structural element, which is referred to in the embodiments described above, is not limited to such a shape, positional relationship or the like, unless it is specifically described or obviously necessary to be limited in principle.

(1) In the above-described embodiments, the butterfly valve 1 has been described as being used in an EGR device, but is not limited thereto. The butterfly valve 1 can be used in various applications for adjusting the flow rate of gas flowing through the gas passage 6, such as adjusting the flow rate of gaseous fuel in a fuel cell. The butterfly valve 1 can be suitably used for a valve that requires the closing ability when the gas passage 6 is fully closed.

(2) In the above-described embodiments, the seal ring 5 is described as being formed of, for example, resin, but is not limited thereto. The seal ring 5 can be composed of various materials such as a combination of resin and metal, metal, or elastomer.

(3) In the above mentioned embodiments, although the seal ring 5 has the separated portion 50 having a step cut shape, the separated portion 50 is not restricted to this configuration. The seal ring 5 may have a shape in which a protrusion and a recess are not provided at one end and the other end in the circumferential direction of the separated portion 50, respectively.

(4) In the above mentioned embodiments, one end surfaces 511, 621, 70 of the separated portion 50 or the other end surfaces 521, 611, 71 of the separated portion 50 as a whole are the inclined surfaces. However, a part of the end surfaces may be an inclined surface. The inclined surface is not limited to a flat surface, and may be a curved surface.

In an assumable example, as a butterfly valve that adjusts the flow rate of gas flowing in the gas passage, for example, the butterfly valve is used in, for example, an EGR (Exhaust Gas Recirculation) device that recirculates a part of exhaust gas from an exhaust pipe of an engine to an intake pipe. In general, the butterfly valve used in the EGR device includes a valve main body provided in the gas passage, a seal ring that fits into a groove provided on an outer periphery of the valve main body, a nozzle that constitutes an inner wall of the gas passage, and the like.

These constituent members are made of different materials. In addition, the butterfly valve used in the EGR device is used in a situation where an environmental temperature at the time of use varies greatly from a standing temperature in a cold region to a high temperature of the exhaust gas. Therefore, clearances provided between the valve body and the seal ring and between the seal ring and the nozzle are set in consideration of the difference in the linear expansion coefficient of each member.

A metal ring may be used as a seal ring that fits into the groove provided on the outer periphery of the valve body. In that case, in general, in order to suppress wear of an inner wall of the nozzle due to the opening/closing operation of the valve body, a surface treatment is performed to ensure the hardness of the nozzle.

On the other hand, the butterfly valve has a seal ring made of resin. Thereby, the wear of the sliding part in the inner wall of the nozzle and the seal ring decreases. Therefore, this butterfly valve can be simplified in configuration, such as eliminating a surface treatment of the nozzle.

Moreover, the seal ring in the butterfly valve has a separated portion provided in a part of circumferential direction, and the separated portion has a step cut shape. In addition, the step cut shape is a shape in which protrusion extending in the circumferential direction from one end in the circumferential direction of the seal ring constituting the separated portion fits into recess provided at the other end in the circumferential direction of the seal ring constituting the separated portion. Thus, when the butterfly valve fully closes the gas passage, the above configuration prevents a gas flow space from being formed in a portion exposed radially outward from the groove portion of the valve body at the separated portion of the seal ring.

By the way, the seal ring used for the butterfly valve has an elastic force that can be expanded and reduced in a radial direction in order to improve a close contact with an inner wall of the gas passage when the gas passage is fully closed. When the butterfly valve fully closes the gas passage, the seal ring is in close contact with the inner wall of the nozzle while having an elastic force to expand outward in the radial direction. Therefore, when the butterfly valve rotates the valve body so as to open the gas passage, the diameter of the seal ring is enlarged by the elastic force of the seal ring itself at a location away from a rotation axis of the valve body. Therefore, if the separated portion of the seal ring exists at a location away from the rotation axis of the valve body, in the state where the butterfly valve opens the gas passage, a distance between one end surface (hereinafter referred to as "one end surface of the separated portion") and the other wall surface in the circumferential direction of the seal ring forming the separated portion is increased. Further, in a state where the butterfly valve closes the gas passage, the distance between one end surface and the other end surface of the separated portion approaches.

When the butterfly valve opens the gas passage while the seal ring is operating in the above described way, if a foreign matter is clogged in the gap at the separated portion, the seal ring cannot be reduced in diameter when the butterfly valve closes the gas passage. The valve may malfunction.

In this regard, since the butterfly valve described above includes the separated portion of the seal ring having a step cut shape, gaps of the separated portion are formed at a plurality of locations. Therefore, there are concerns that the number of places where foreign matters are clogged increases and the risk of malfunctioning increases.

An object of the present disclosure is to provide the butterfly valve which can increase the reliability of valve operation in view of the above aspect.

In order to achieve the above object, the butterfly valve provided in the gas passage includes a valve body, a shaft, a groove portion and a seal ring. The valve body has a substantially disc shape and is provided in the gas passage. The shaft supports the valve body so as to be rotatable in the gas passage. A groove portion provided at an outer edge portion of the valve body on an outer side in a radial direction so as to extend in a circumferential direction of the valve body. A seal ring is formed in an annular shape, has a separated portion as a cut in a part in the circumferential direction, and is fitted in the groove portion of the valve body. At least one of one end surface in a circumferential direction and the other end surface in the circumferential direction of the seal ring constituting the separated portion is an inclined surface that is inclined so as to guide a foreign matter accumulated in a gap of the separated portion to an outside of the gap when a diameter of the seal ring is reduced.

According to this configuration, the foreign matter accumulated in the gap of the separated portion when the butterfly valve opens the gas passage is guided along the inclined surface and is discharged in the radial direction or the axial direction of the seal ring as the seal ring diameter is reduced when the butterfly valve closes the gas passage. Therefore, the foreign matter is prevented from clogging in the gap of the separated portion of the seal ring, so that the butterfly valve rotates the shaft and reliably fully closes the gas passage. Therefore, the butterfly valve can prevent the valve from malfunctioning and can improve the reliability of the valve operation.

The invention claimed is:

1. A butterfly valve provided in a gas passage comprising:
   a valve body having a substantially disc shape and provided in the gas passage;
   a shaft that rotatably supports the valve body in the gas passage;
   a groove portion provided at an outer edge portion of the valve body on an outer side in a radial direction so as to extend in a circumferential direction of the valve body; and
   a seal ring that is formed in an annular shape, has a separated portion as a cut in a part of the circumferential direction, and fits into the groove portion of the valve body, wherein
   at least one of one end surface in a circumferential direction and the other end surface in the circumferential direction of the seal ring constituting the separated portion is an inclined surface that is inclined so as to guide a foreign matter accumulated in a gap of the separated portion to an outside of the gap when a diameter of the seal ring is reduced, and
   in both a state in which the butterfly valve opens the gas passage and a state in which the butterfly valve closes the gas passage, the inclined surface of the separated portion is inclined such that the gap of the separated portion in increased from the outer side in the radial direction to the inner side in the radial direction.

2. The butterfly valve according to claim 1, wherein
   the inclined surface of the separated portion is inclined such that the gap of the separated portion is increased toward an outer side in an axial direction of the seal ring.

3. The butterfly valve according to claim 1, wherein
in both a state in which the butterfly valve opens the gas passage and a state in which the butterfly valve closes the gas passage, the inclined surface of the separated portion is inclined such that the gap of the separated portion is increased from an inner side in a radial direction to an outer side in the radial direction, and
the inclined surface of the separated portion is inclined such that the gap of the separated portion is increased toward an outer side in an axial direction of the seal ring.

4. The butterfly valve according to claim 1, wherein
the separated portion of the seal ring has a step cut shape in which a protrusion extending in the circumferential direction from one end in the circumferential direction of the seal ring constituting the separated portion fits into a recess provided at the other end in the circumferential direction of the seal ring constituting the separated portion, and
at least one of an end surface in the circumferential direction of the protrusion and an end surface in the circumferential direction of the recess is an inclined surface that is inclined so as to guide the foreign matter accumulated in the gap of the separated portion to the outside of the gap when a diameter of the seal ring is reduced.

5. The butterfly valve according to claim 1, wherein
one end surface in the circumferential direction of the separated portion is an inclined surface which is inclined with respect to a line segment connecting a center of the gap formed by one end surface and the axis of the seal ring, and the other end surface in the circumferential direction of the separated portion is an inclined surface which is inclined with respect to the line segment connecting the center of the gap formed by the other end surface and the axis of the seal ring.

6. The butterfly valve according to claim 1, wherein
at least one of one end surface in the circumferential direction of the separated portion and the other end surface in the circumferential direction of the separated portion is a surface parallel to a line segment connecting one end surface and the axis of the seal ring.

7. The butterfly valve according to claim 4, wherein
the end surface in the circumferential direction of the protrusion constituting the step cut shape of the seal ring is an inclined surface with respect to a line segment connecting the center of the gap formed by the end surface and the axis of the seal ring, and is an inclined surface inclined with respect to the axis of the seal ring, and the end surface in the circumferential direction of the recess is an inclined surface inclined with respect to a line segment connecting the center of the gap formed by the end surface and the axis of the seal ring, and is an inclined surface inclined with respect to the axis of the seal ring.

8. The butterfly valve according to claim 1, wherein
the end surface of an inner part in the radial direction of one end of the separated portion is the inclined surface, the inclined surface being inclined with respect to a line segment connecting a center of a gap formed by the end surface and the axis of the seal ring, and
the end surface of an inner part in the radial direction of the other end of the separated portion is another inclined surface inclined with respect to the line segment connecting the center of the gap formed by the end surface and the axis of the seal ring.

* * * * *